United States Patent [19]

Coatu

[11] 4,211,159
[45] Jul. 8, 1980

[54] PORTABLE BARBECUE GRILL

[76] Inventor: Ovidiu Coatu, 1314 W. 111th St., Cleveland, Ohio 44102

[21] Appl. No.: 840,106

[22] Filed: Oct. 6, 1977

[51] Int. Cl.² .............................................. A47J 37/04
[52] U.S. Cl. .................................................... 99/421 V
[58] Field of Search .................... 99/419, 420, 421 V, 99/421 HV, 421 HH, 427, 445; 126/30

[56] References Cited

U.S. PATENT DOCUMENTS

| | | | |
|---|---|---|---|
| 955,140 | 4/1910 | Cronk | 99/421 V X |
| 1,574,306 | 2/1926 | Ramsey | 99/421 V X |
| 1,612,252 | 12/1926 | Beverly | 99/421 V |
| 1,719,713 | 7/1929 | Miller | 99/421 V X |
| 2,522,223 | 9/1950 | Hardin et al. | 126/30 UX |
| 2,687,080 | 8/1954 | Dorin | 99/421 V X |
| 2,887,944 | 5/1959 | Walker | 99/421 HH |
| 2,914,283 | 11/1959 | Jorgensen | 126/30 UX |
| 2,940,381 | 6/1960 | Cottongim et al. | 99/445 |
| 3,058,414 | 10/1962 | Armstrong | 99/421 HH |
| 3,169,470 | 2/1965 | Oatley | 99/421 HH |
| 3,590,726 | 7/1971 | Warner | 99/419 |
| 3,604,341 | 9/1971 | Coroneos | 99/421 V |
| 3,817,164 | 6/1974 | Hintze | 99/421 V |

FOREIGN PATENT DOCUMENTS

| | | | |
|---|---|---|---|
| 815396 | of 1937 | France | 99/421 V |
| 1069985 | of 1954 | France | 99/421 V |
| 343997 | 1/1960 | Switzerland | 99/421 R |

*Primary Examiner*—Harvey C. Hornsby
*Assistant Examiner*—Arthur O. Henderson
*Attorney, Agent, or Firm*—Fleit & Jacobson

[57] ABSTRACT

A portable barbecue grill apparatus has a unitary frame with an integral handle and removable legs. The heat sources are arranged vertically with the meat placed on two rotating spits, also vertically arranged. The spits are suspended from the frame and a single motor drive both from the bottom. Grease collecting pans, located at the bottom of the spits, are also rotated to prevent burning of the collected grease.

1 Claim, 12 Drawing Figures

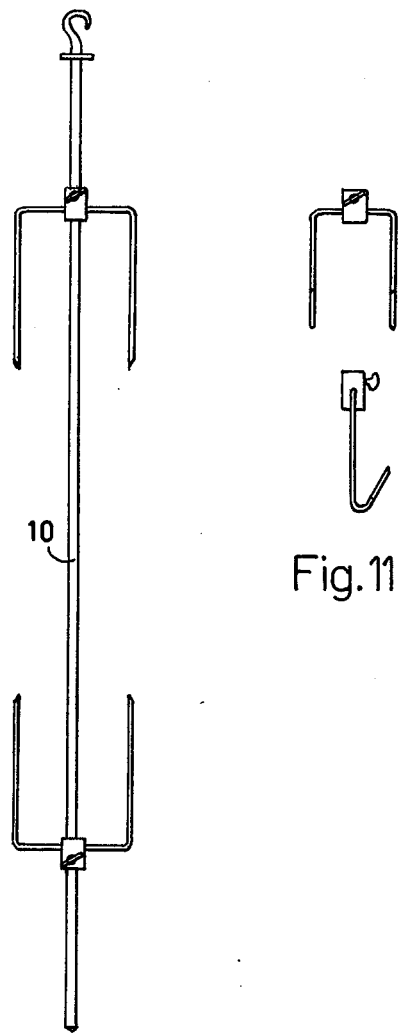
Fig. 11
Fig. 10
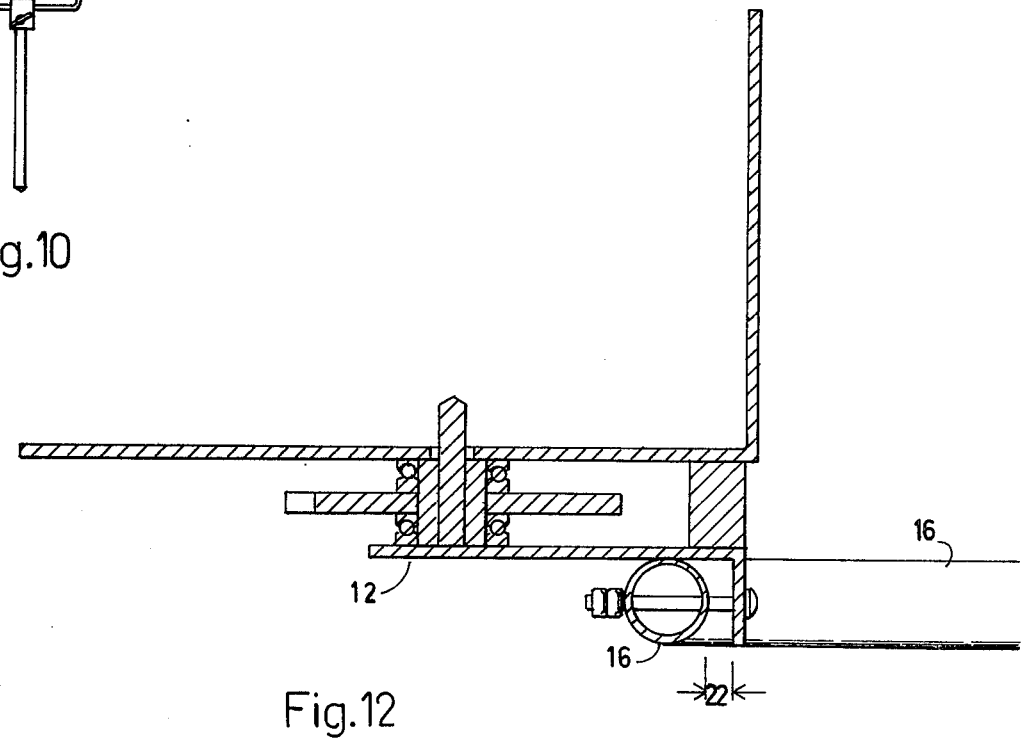
Fig. 12

PORTABLE BARBECUE GRILL

BACKGROUND OF THE INVENTION

The invention relates to a portable, vertically oriented barbecue grill.

Conventional barbecue grills tend to burn food being broiled or even catch fire if left unattended and accordingly one object of the present invention is to provide a system which minimizes this possibility.

Another object of the invention is to provide a barbecue grill which will continue to operate effectively when unattended.

Further objects of the invention include the provision of a portable barbecue grill which is easy to handle and transport when assembled, which can be used with or without detachable legs, so that it can be used in a free-standing mode or positioned on a table or the like, and which is simple to clean and economical to operate.

SUMMARY OF THE INVENTION

A barbecue grill in accordance with the invention has a continuous tubular frame comprising a V-shaped base portion, with the arms of the V continued upwardly to provide vertical portions, outwardly to provide a V-shaped top portion and downwardly for about one half of the height of the grill to form a carrying handle.

A pair of vertically extending fire containers are mounted on the respective vertical portions of the grill and the arms of the top and base portions have rotary mounting means for suspending a pair of spits in front of the fire containers.

An electric motor and chain and sprocket drive is provided for rotating the spits along with grease collector pans which are situated beneath the respective spits. Rotation of the grease collector pans along with the spits minimizes any tendency for collected grease to catch alight while also providing a convenient source of basting liquid for meat being broiled.

The grill further includes a pair of supporting legs detachably secured to the vertical frame portions. With this arrangement, the grill can either be supported on the legs, or with the legs removed, it can be supported on the V-shaped base portion.

DESCRIPTION OF DRAWINGS

FIG. 10 is an elevational view of a spit;

FIG. 11 shows details of hook attachments for the spits; and

FIG. 12 is a sectional elevation of a drive wheel for imparting motion to the spit-rotating sprockets.

DESCRIPTION OF PREFERRED EMBODIMENT

Figure 1:
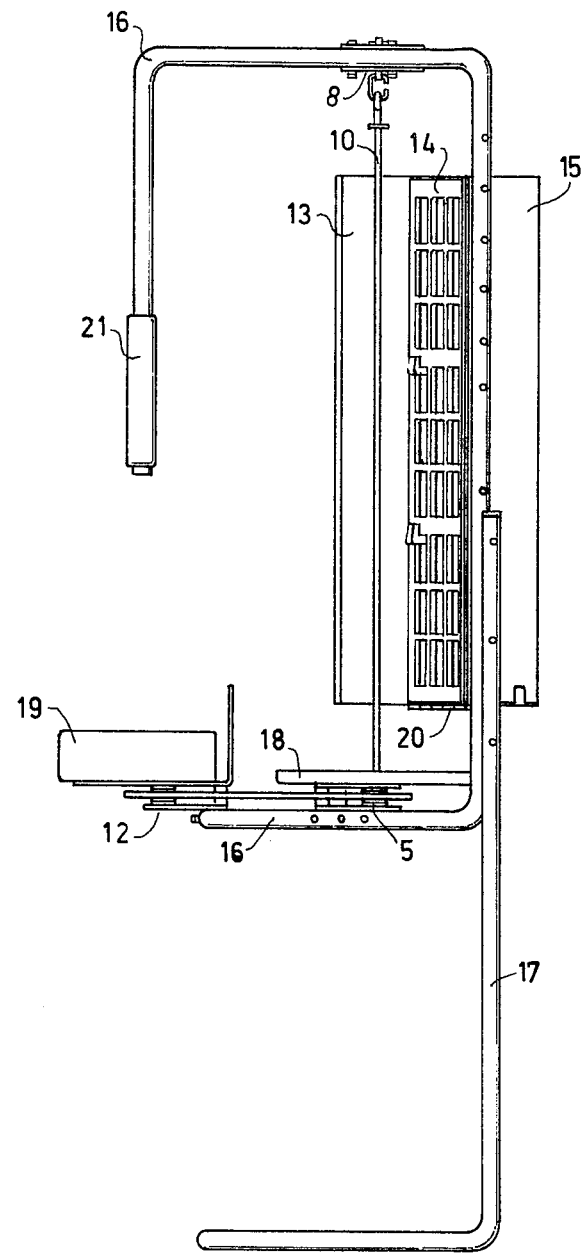
FIG. 1 is a side elevation of an assembled portable barbecue grill.
Figure 2:
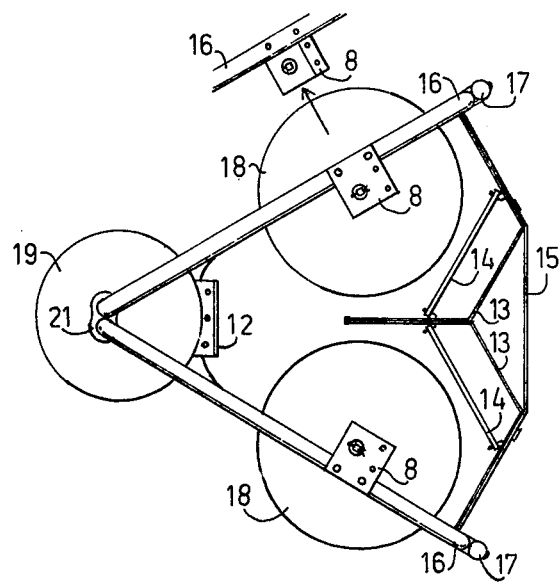
FIG. 2 is a plan view of the grill.
Figure 3:
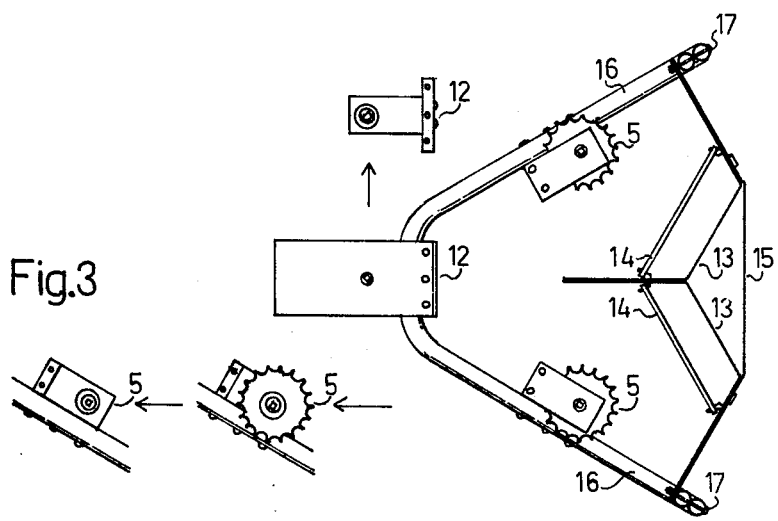
FIG. 3 is a sectional plan view of the lower part of the grill showing details of the rotary spit mounting and drive arrangement.
Figure 4:
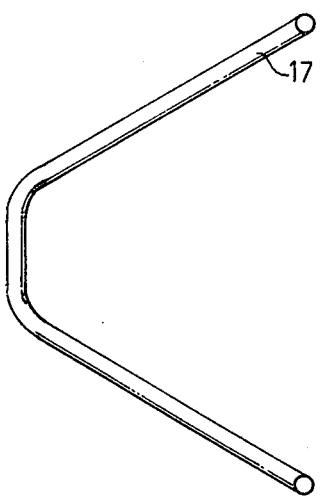
FIG. 4 is a plan view of detachable legs for the grill.

The illustrated portable barbecue grill has a tubular frame 16, with a horizontal V-shaped base portion (see FIG. 3) the arms of which are continued upwardly to provide two vertical portions, outwardly to provide a V-shaped horizontal top portion (see FIG. 2) and then downwardly for a distance equal to about half the height of the frame. The ends of the arms are provided with a wood-muff handle 21.

Associated with the vertical frame portions are a pair of vertically extending fire containers formed from a bent metal sheet 13, a reinforcing metal sheet 15, a pair of removable front grilles 14 and a hinged bottom 20.

Figure 6:
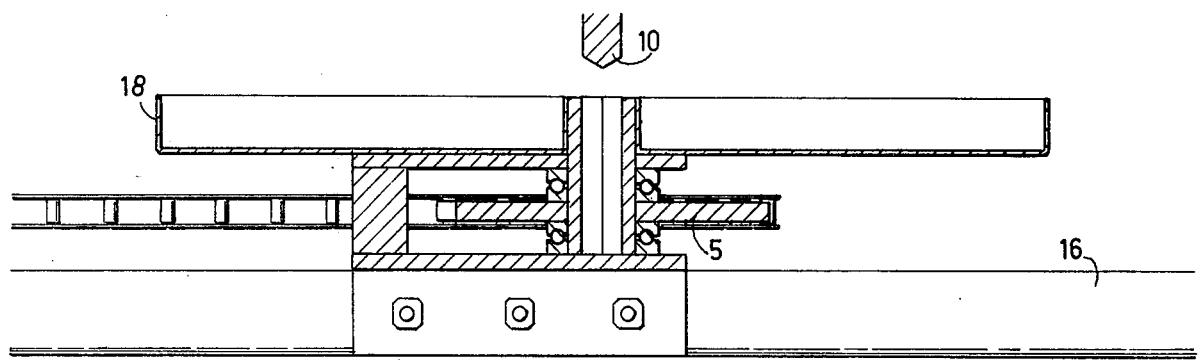
FIGS. 6 and 7 are mutually perpendicular sectional elevations through one of the spit drives and showing a grease collecting tray.
Figure 5:
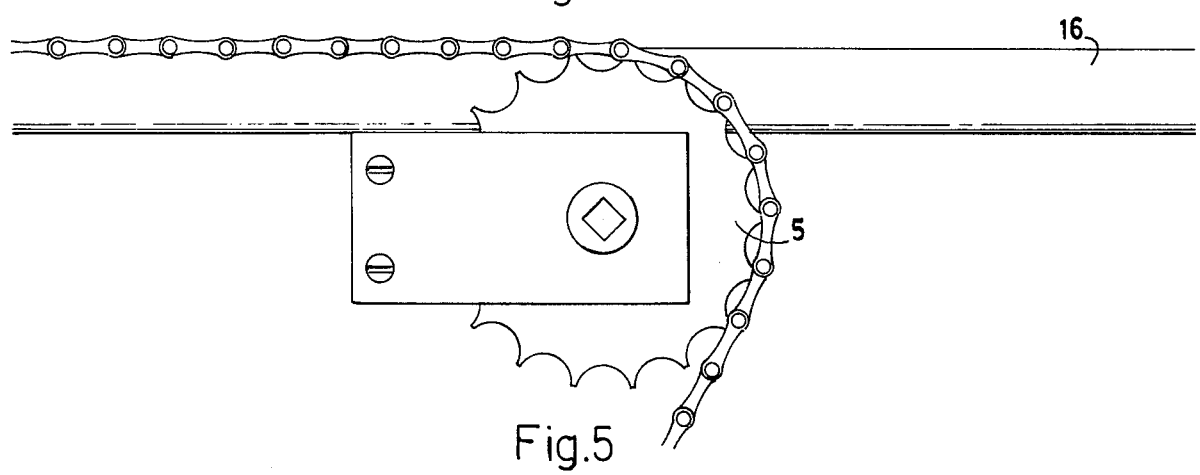
FIG. 5 is a plan view showing details of a chain and sprocket drive for one of the grill spits with the grease-collecting tray removed.
Figure 7:
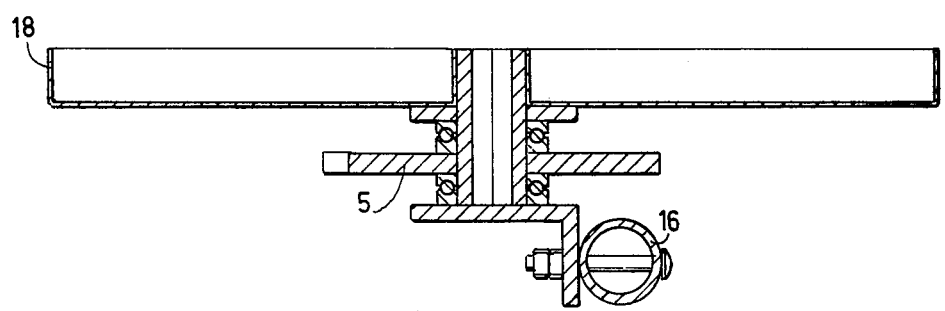

A pair of rotary spits 10 are suspended in front of the respective grilles 14 between suspension means 8 on top portion of the frame and spit drive means on the base portion of the frame. The drive means includes an a.c. electric motor 19 with associated drive wheel which rotates individual spit sprockets 5 through a chain drive. The spits have square section lower ends which fit in complimentary bores in bushes associated with the sprockets 5 (see FIG. 6) whereby rotary drive is imparted to the spits and the rotary bushes also carry grease collection pans 18 which thereby rotate with the spits. As illustrated, the sprockets 5 rotate between ball-bearings.

Figures 8, 9:
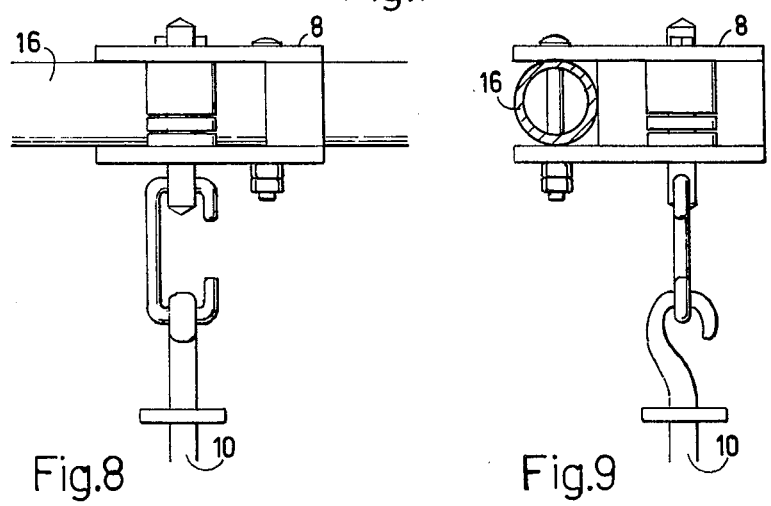
FIGS. 8 and 9 are mutually perpendicular elevational views showing a spit suspension system.

At their upper ends the spits are rotatably suspended from hooks carried by the suspension means 8 attached to the upper frame portion (FIGS. 8 and 9) and as illustrated, the upper end portions of the spits have surrounding rings or collars which enables them to be easily lifted by means of a conventional two-tine cooking fork. The spits can be provided with standard screw-on hooks as shown in FIG. 10 or fluke-type hooks as shown in FIG. 11. The suspension means 8 are bolted to the frame and each comprises a central square bar carrying a suspension hook and which rotates freely on ball-bearing rings.

The grill is provided with legs 17 detachably secured to the vertical portions of frame 16.

The manner of mounting the motor and associated drive sprocket is shown in FIG. 12. A plate 12 carrying the motor and drive sprocket is bolted to frame 16. Stretching of the drive chain can be accommodated by adjusting the distance 22.

The system is conceived on the basis of a vertically oriented fire source-spit correlation. Each spit is backed by a fire container comprising a bent metal sheet and a front grille which works as a unit therefore enabling the use of one or both units depending on the required amount of meat to be barbecued and as such cutting down on the waste of charcoal briquets. The fire source 13, 14 behind the turning spits is an advantageous arrangement for its purpose, providing even heating and substantially eliminating the possibility of grease dropping on the fire. Instead, grease is collected in the grease collector pans 18 which also faciliates basting of the meat during broiling. A spit provided with standard hooks is used for large round pieces such as a leg of lamb, beef round or chicken while a spit provided with fluke-type hooks is used for meat portions of different shape and size such as short ribs, steaks or sausages. The system also allows for the use of a single spit with combined hooks. Each fire container has a hinged bottom 20 for easy cleaning and the front grilles 14 are removable being installed on four side hooks for this purpose. The spit once loaded with meat is hooked on the upper open link of the suspension means and its bottom end is inserted into the square bore of one of the sprocket wheel bushes. The collar at the top of the spit is provided to handle it with the help of a two-tine type of fork.

The a.c. motor 19 conveys motion to the spits and grease collection pans through the sprocket wheel and chain drive which can be of a conventional bicycle type. The continuous metal tubing frame 16 bent to the required shape carries all parts of the system and also provides a handle covered by wood-muff for easy handling and carrying when assembled.

The described barbecue grill is simple in construction, practical in use and at the same time easy to handle and carry. An efficient portable barbecue grill is provided having a fire source behind the spits instead of underneath, thus substantially minimizing the fire hazard. Also provided are practical removable grease collectors which help basting during broiling and detachable legs are provided so that the grill can be free standing or supported on the base of the frame 16 by removal of the legs.

I claim:

1. A portable barbecue grill comprising:
   a continuous tube frame formed having a horizontal V-shaped base portion with the arms of the V continuing upwardly as two vertical portions and continuing outwardly to form a V-shaped horizontal top portion with the point of the V extending vertically downward for a distance substantially one-half the height of said barbecue grill, forming a handle means for grasping and transporting said barbecue grill;
   a pair of detachable supporting legs attached to said vertical frame portion, said legs being removable to permit said grill to be supported on a surface by said V-shaped base portion;
   a pair of vertically arranged fire containers each having a front grill and mounted on one of said vertical frame portions;
   a pair of spits each being rotatably suspended from one of the two arms of said top portion and being arranged in front of said fire containers;
   a pair of grease collector pans each being rotatably mounted on one of the arms of said V-shaped base portion and each being disposed beneath one of said two spits;
   an electric motor mounted on said V-shaped base portion at the point of the V; and
   a sprocket and chain drive means operably connecting said electric motor and said pair of spits and said pair of grease collector pans, wherein said sprocket and chain drive means comprise a first sprocket wheel affixed to an output shaft of said motor, a second sprocket wheel rotatably mounted on said frame and being operably connected to said pair of spits and to said pair of grease collector pans for mutual rotation therewith, and a chain operably connecting said first and second sprocket wheels; whereby said electric motor rotates said spits and said grease collector pans in front of said fire containers.

* * * * *